(12) United States Patent
Liang et al.

(10) Patent No.: US 7,125,124 B2
(45) Date of Patent: Oct. 24, 2006

(54) PROJECTION SYSTEM

(75) Inventors: Nai-Yueh Liang, Taipei (TW); Ke-Shu Chin, Jhonghe (TW); Chih-Neng Chang, Taipei (TW); An-Hwa Yu, Sinjhuang (TW); Ta-Kun Kung, Taipei (TW)

(73) Assignee: Prodisc Technology Inc., Taipei Hsien (TW)

( * ) Notice: Subject to any disclaimer, the term of this patent is extended or adjusted under 35 U.S.C. 154(b) by 33 days.

(21) Appl. No.: 10/916,553

(22) Filed: Aug. 12, 2004

(65) Prior Publication Data

US 2005/0243289 A1    Nov. 3, 2005

(30) Foreign Application Priority Data

Apr. 28, 2004   (TW) .............................. 93111890 A

(51) Int. Cl.
*G03B 21/28* (2006.01)
(52) U.S. Cl. ......................................... 353/99; 359/629
(58) Field of Classification Search ................. 353/20, 353/38, 97, 98, 99, 74, 77, 78, 79; 349/18, 349/5, 7, 8, 9; 359/629, 638, 639
See application file for complete search history.

(56) References Cited

U.S. PATENT DOCUMENTS

| | | | | |
|---|---|---|---|---|
| 5,005,968 A | * | 4/1991 | Tejima et al. ................ | 353/122 |
| 5,250,967 A | * | 10/1993 | Miyashita ..................... | 353/38 |
| 5,755,501 A | * | 5/1998 | Shinohara et al. ............ | 353/31 |
| 5,971,546 A | * | 10/1999 | Park ............................. | 353/38 |
| 6,184,969 B1 | * | 2/2001 | Fergason ..................... | 349/196 |
| 6,529,332 B1 | * | 3/2003 | Konno ......................... | 359/634 |
| 6,623,121 B1 | * | 9/2003 | Sato ............................. | 353/20 |

* cited by examiner

*Primary Examiner*—William C. Dowling
(74) *Attorney, Agent, or Firm*—Birch, Stewart, Kolasch & Birch, LLP

(57) ABSTRACT

A projection system includes a light source, an image unit, a projection unit, a light-reflection unit and a screen. The light source emits a light beam. The image unit receives the light beam from the light source and forms an image light. The projection unit is disposed on the route of the image light. The projection unit receives the image light from the image unit and projects it out. The light-reflection unit disposed on the route of the image light has a reflecting layer and at least one light-pervious reflecting layer, and receives the image light from the projection unit. The light-pervious reflecting layer reflects the received image light to form a first image light. The reflecting layer reflects the received image light to form a second image light. The screen is disposed on the route of the first image light and the second image light. The first image light is projected on the screen to form a first image. The second image light is projected on the screen to form a second image. There is a displacement between the first and the second images.

3 Claims, 9 Drawing Sheets

PROJECTION SYSTEM

This Nonprovisional application claims priority under 35 U.S.C. §119(a) on Patent Application No(s). 093111890 filed in Taiwan, Republic of China on Apr. 28, 2004, the entire contents of which are hereby incorporated by reference.

BACKGROUND OF THE INVENTION

1. Field of Invention

The invention relates to a projection system and, in particular, to a projection system with a lowered grid effect.

2. Related Art

Due to the multiple needs of a large display area, a small size, and a light weight, the image projection system has become one of the most popular products in the opto-electric industry.

With reference to FIGS. 1 and 2, a conventional projection system 1 includes a light source 11, a driving unit 12, an image unit 13, a projection unit 14, a mirror 15, and a screen 16. The image unit 13 includes several image pixels 131 and several transmission devices 132. The transmission devices 132 are connected to the image pixels 131 to transmit signals, which are sent out from the driving unit 12, to the image pixels 131.

Each image pixel 131 includes a transparent region 1311 and an opaque region 1312. Due to the transmission device 132, light cannot penetrate the opaque region 1312 of the image pixel 131. Since the image pixels 131 includes opaque regions 1312, the image shown on the screen 16 is divided by grid lines. This is the so-called grid effect.

In order to solve the problem of the grid effect, a micro lens can be provided in front of each image pixel 131 to magnify the image. However, this method has a high cost. Therefore, how to provide a low-cost projection system that has a low grid effect is an important subjective.

SUMMARY OF THE INVENTION

In view of the foregoing, the invention is to provide a projection system that reduces the grid effect.

To achieve the above, the projection system of the invention includes a light source, an image unit, a projection unit, a light-reflection unit, and a screen. The light source emits a light beam. The image unit receives the light beam from the light source and produces an image light. The projection unit is disposed on the route of the image light to receive the image light generated by the image unit and to project it out. The light-reflection unit disposed on the route of the image light projected by the projection unit has a reflecting layer and at least one light-pervious reflecting layer, and receives the image light from the projection unit. The light-pervious reflecting layer reflects part of the received image light to form a first image light. The reflecting layer totally reflects the received image light to form a second image light. The screen is disposed on the route of the first image light and the second image light. The first image light is projected on the screen to form a first image. The second image light is projected on the screen to form a second image. There is a displacement between the first and the second images.

To achieve the above, another projection system of the invention includes a light source, an image unit, a projection unit, and a screen. The light source emits a light beam. The image unit receives the light beam from the light source and produces an image light. The projection unit is disposed on the route of the image light to receive the image light generated by the image unit. The projection unit has a reflecting layer and at least one light-pervious reflecting layer. The light-pervious reflecting layer reflects part of the received image light to form a first image light. The reflecting layer totally reflects the received image light to form a second image light. Then, the projection unit projects the first image light and the second image light out. The screen is disposed on the route of the first image light and the second image light. The first image light is projected on the screen to form a first image. The second image light is projected on the screen to form a second image. There is a displacement between the first and the second images.

To achieve the above, another projection system of the invention includes a light source, an image unit, a light-reflecting unit, a projection unit, and a screen. The light source emits a light beam. The image unit receives the light beam from the light source and produces an image light. The light-reflecting unit is disposed on the route of the image light and has a reflecting layer and at least one light-pervious reflecting layer. The light-reflecting unit receives the image light generated by the image unit. The light-pervious reflecting layer reflects part of the received image light to form a first image light. The reflecting layer totally reflects the received image light to form a second image light. The projection unit is disposed on the route of the first image light and the second image light. The projection unit receives the first image light and the second image light and then projects them out. The screen is disposed on the route of the first image light and the second image light. The first image light is projected on the screen to form a first image. The second image light is projected on the screen to form a second image. There is a displacement between the first and the second images.

To achieve the above, the projection system of the invention includes a light source, an image unit, a projection unit, a birefringent unit, and a screen. The light source emits a light beam. The image unit receives the light beam from the light source and produces an image light. The projection unit is disposed on the route of the image light to receive the image light generated by the image unit and to project it out. The birefringent unit disposed on the route of the image light projected by the projection unit. Then, the birefringent unit refracts the received image light out by a plurality of refractive image light. The screen is disposed on the route of the refractive image light. The refractive image light is projected on the screen to form a plurality of images. There is a displacement between the images.

To achieve the above, another projection system of the invention includes a light source, an image unit, a projection unit, and a screen. The light source emits a light beam. The image unit receives the light beam from the light source and produces an image light. The projection unit is disposed on the route of the image light to receive the image light generated by the image unit. The projection unit has a birefringent device, which receives the image light and then refracts the received image light out by a plurality of refractive image light. Then, the projection unit projects the refractive image light out. The screen is disposed on the route of the refractive image light. The refractive image light is projected on the screen to form a plurality of images. There is a displacement between the images.

To achieve the above, yet another projection system of the invention includes a light source, an image unit, a birefringent unit, a projection unit, and a screen. The light source emits a light beam. The image unit receives the light beam from the light source and produces an image light. The birefringent unit is disposed on the route of the image light to receive the image light generated by the image unit. Then, the birefringent unit refracts the received image light out by a plurality of refractive image light. The projection unit is disposed on the route of the refractive image light to receive the refractive image light and then to project the received refractive image light out. The screen is disposed on the route of the refractive image light. The refractive image light is projected on the screen to form a plurality of images. There is a displacement between the images.

As described above, the projection system of the invention contains a light-reflection unit, a birefringent device or a birefringent unit to form several images on a screen, wherein there is a displacement between the images. Therefore, the grid effect can be reduced.

BRIEF DESCRIPTION OF THE DRAWINGS

The invention will become more fully understood from the detailed description given hereinbelow illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The projection system can be a reflective liquid crystal projection system, a digital optical processing system, or a liquid crystal projection system. The reflective liquid crystal projection system is used for example in the following embodiment.

Figure 1:
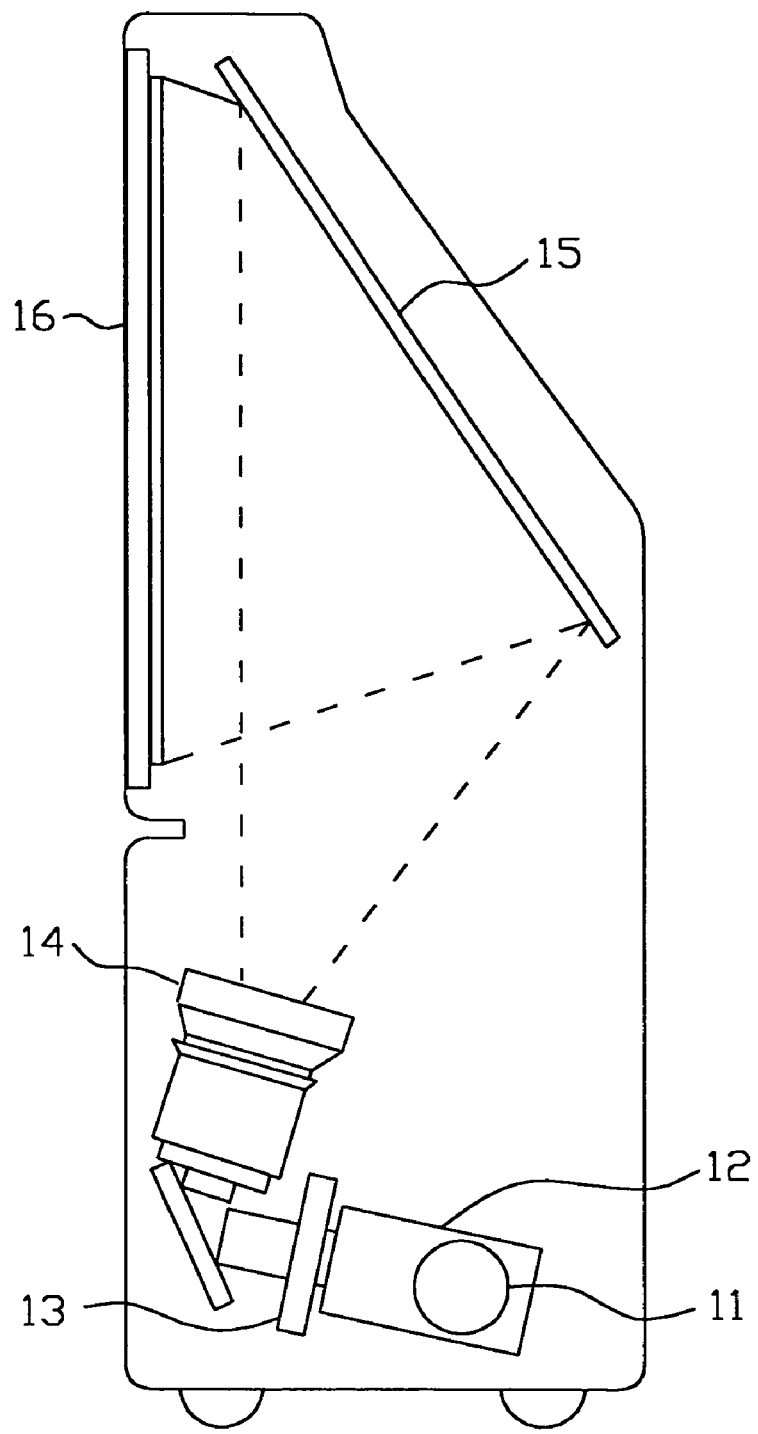
FIG. 1 is a schematic view of the conventional projection system.
Figure 2:
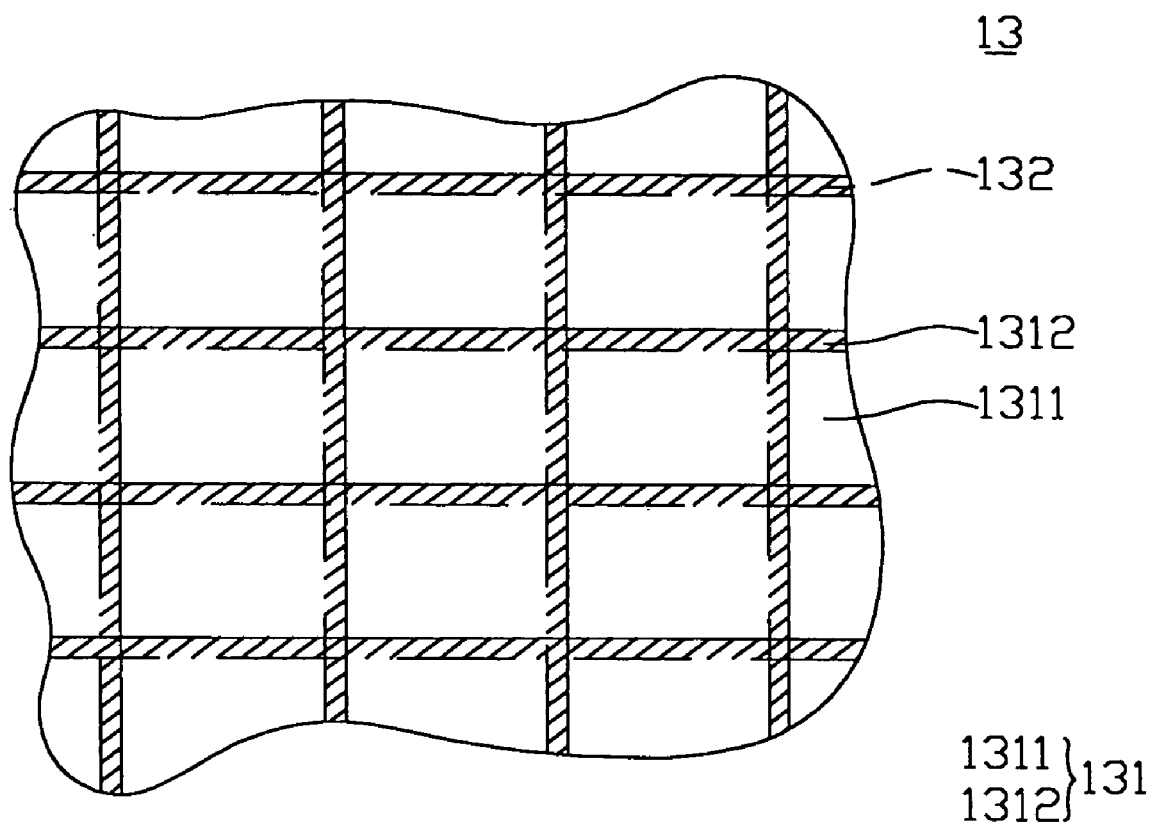
FIG. 2 is a partially enlarged schematic view of the conventional image unit.
Figure 3:
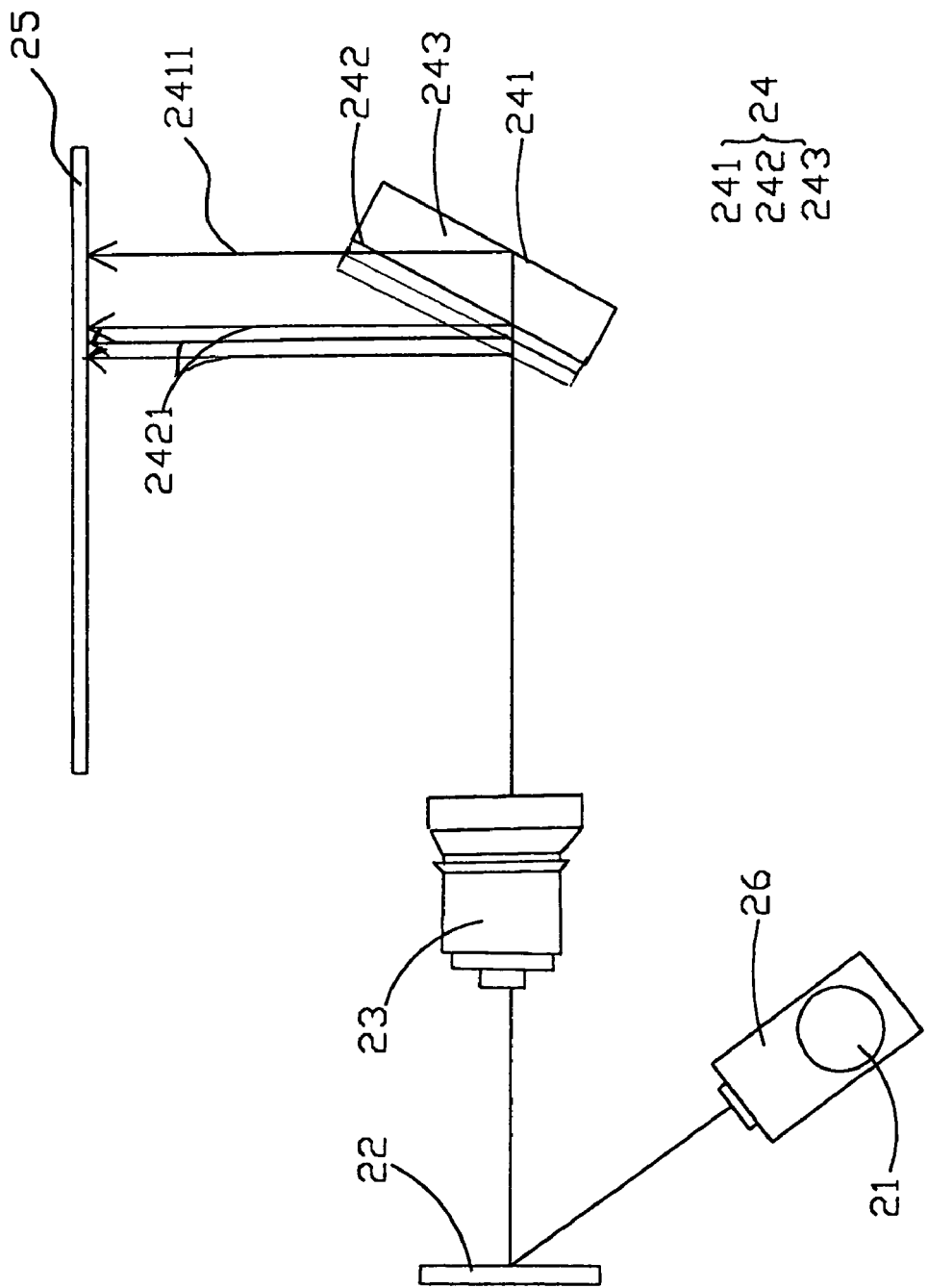
FIG. 3 is a schematic view showing a projection system according to a first embodiment of the invention.
Figure 4:
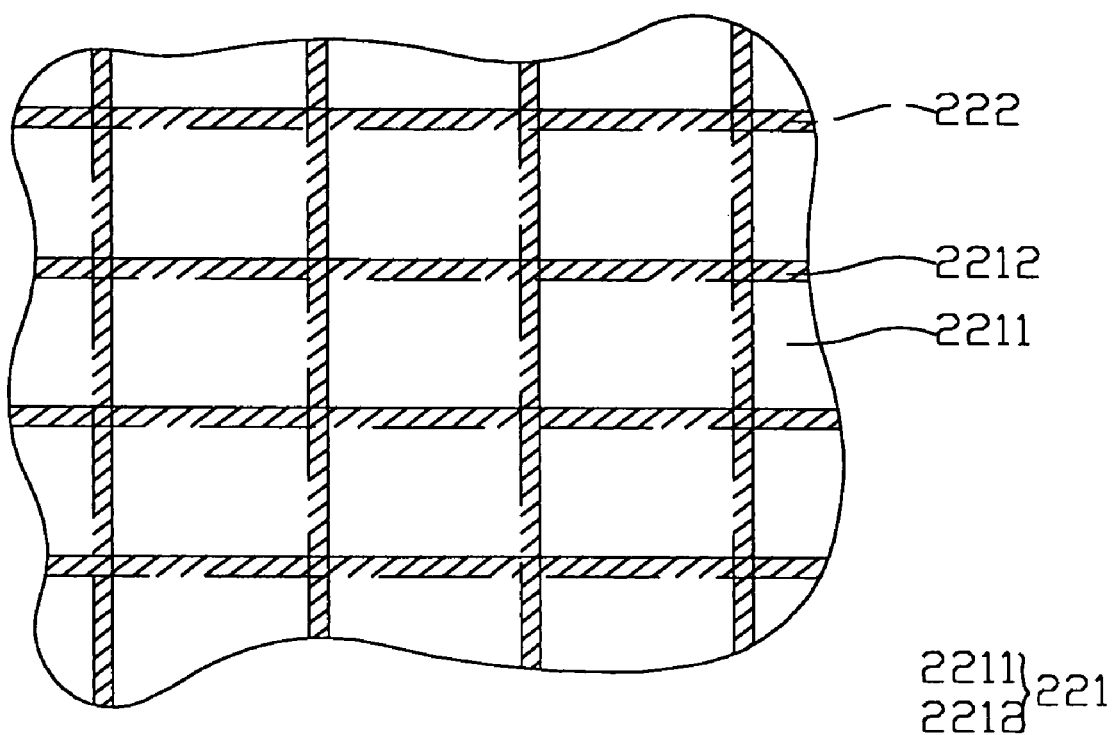
FIG. 4 is a partially enlarged schematic view showing an image unit according to the first embodiment of the invention.

As shown in FIGS. 3 and 4, the projection system 2 according to the first embodiment of the invention includes a light source 21, an image unit 22, a projection unit 23, a light-reflection unit 24, and a screen 25. The light source 21 emits a light beam.

In this embodiment, the projection system 2 further includes a driving unit 26. The driving unit 26 is electrically connected to the image unit 22, and sends signals to the image unit 22 to control the action of the image unit 22. The image unit 22 receives the light from the light source 21 and the signals from the driving unit 26, and then produces an image light. The image unit 22 includes several image pixels 221 and several transmission devices 222. The transmission devices 222 are electrically connected to the image pixels 221 to transmit signals send from the driving unit 26 to the image pixels 221. The image pixel 221 includes a transparent region 2211 and an opaque region 2212. Due to the transmission devices 222, the opaque region 2212 makes some portion of the image pixels 221 become opaque.

The projection unit 23 is disposed on the route of the image light to receive the image light generated by the image unit 22 and then to project it out. In the present embodiment, the projection unit 23 can be a lens set.

The light-reflection unit 24 is disposed on the route of the image light, has a reflecting layer 241 and at least one light-pervious reflection layer 242, and receives the image light from the projection unit 23. In the embodiment, the light-pervious reflecting layer 242 reflects part of the received image light to form a first image light 2421. The reflecting layer 241 totally reflects the received image light to form a second image light 2411.

The light-reflection unit 24 further includes at least one transparent medium 243. The transparent medium 243 is provided between the light-pervious reflection layer 242 and the reflecting layer 241. The transparent medium 243 can be a thin film formed by a coating process or simply a piece of thin glass, which is directly provided. Because of the transparent medium 243, there is a first displacement between the first image light 2421 and the second image light 2411.

Figure 5:
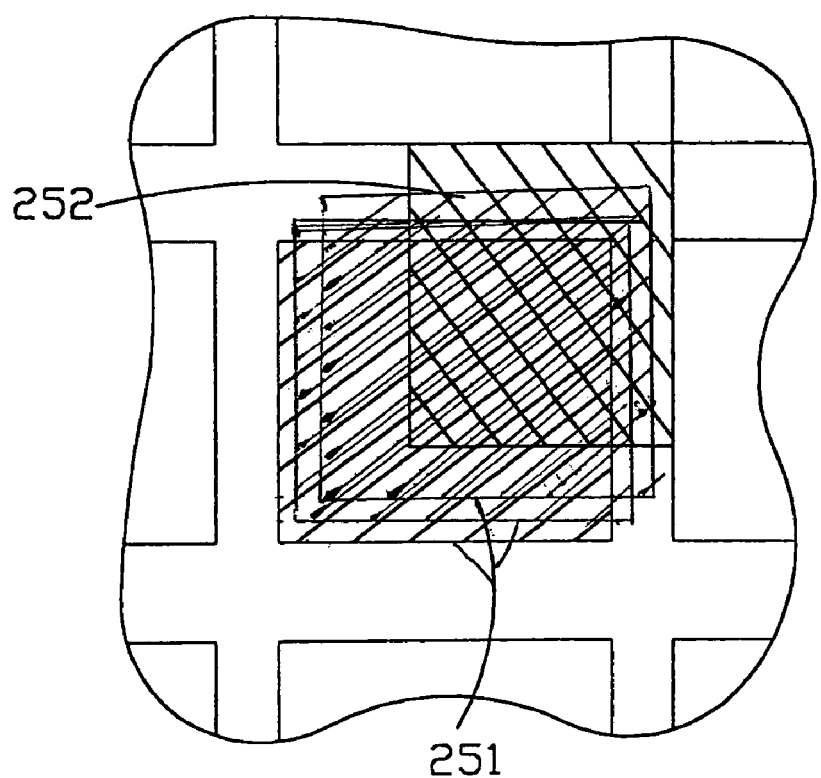
FIG. 5 is a partially enlarged schematic view showing a screen according to the first embodiment of the invention.

As shown in FIGS. 3 and 5, the screen 25 is disposed on the route of the first image light 2421 and the second image light 2411. The first image light 2421 is shot onto the screen 25 so as to form a first image 251. The second image light 2411 is shot onto the screen 25 so as to form a second image 252. There is a second displacement between the first image 251 and the second image 252.

When the light-reflection unit 24 has several light-pervious reflecting layers 242, since every two of the light-pervious reflecting layers 242 have an interval in between, the light-pervious reflecting layers 242 reflect the received image light projected from the light-reflection unit 24 out as several first image lights 2421. Furthermore, the reflecting layer 241 reflects the received image light projected from the light-reflection unit 24 out as the second image light 2411. In such a case, there is a displacement between any two of the first image lights 2421 and between the first image light 2421 and the second image light 2411. The displacement is determined by the thickness of the light-pervious reflecting layers 242.

Figure 6:
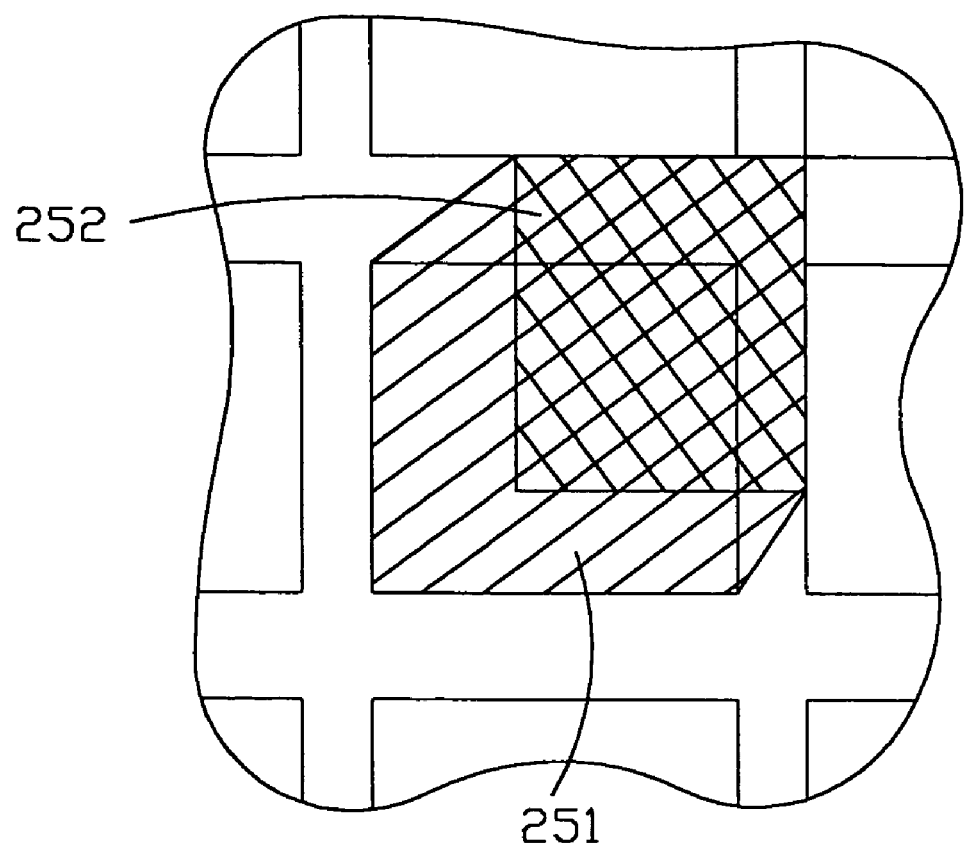
FIG. 6 is a partially enlarged schematic view showing another screen according to the first embodiment of the invention.

The first image lights 2421 form several first images 251 on the screen 25. Since there is a displacements between the first image lights 2421 and between the first image light 2421 and the second image light 2411, there is a corresponding displacement between the first images 251 and between the first image 251 and the second image 252 formed on the screen 25, as shown in FIG. 6.

Due to the displacements between the first image lights 2421 and between the first image lights 2421 and the second image lights 2411, the displacements between the first images 251 and between the first images 251 and the second images 252 are obtained, which results in that there is still images at the grid lines caused by the opaque region 2212 on the screen 25. Therefore, the grid effect of the prior art can be reduced or even removed.

In the following additional embodiments of the invention, the references are the same as the previous embodiment.

Figure 7:
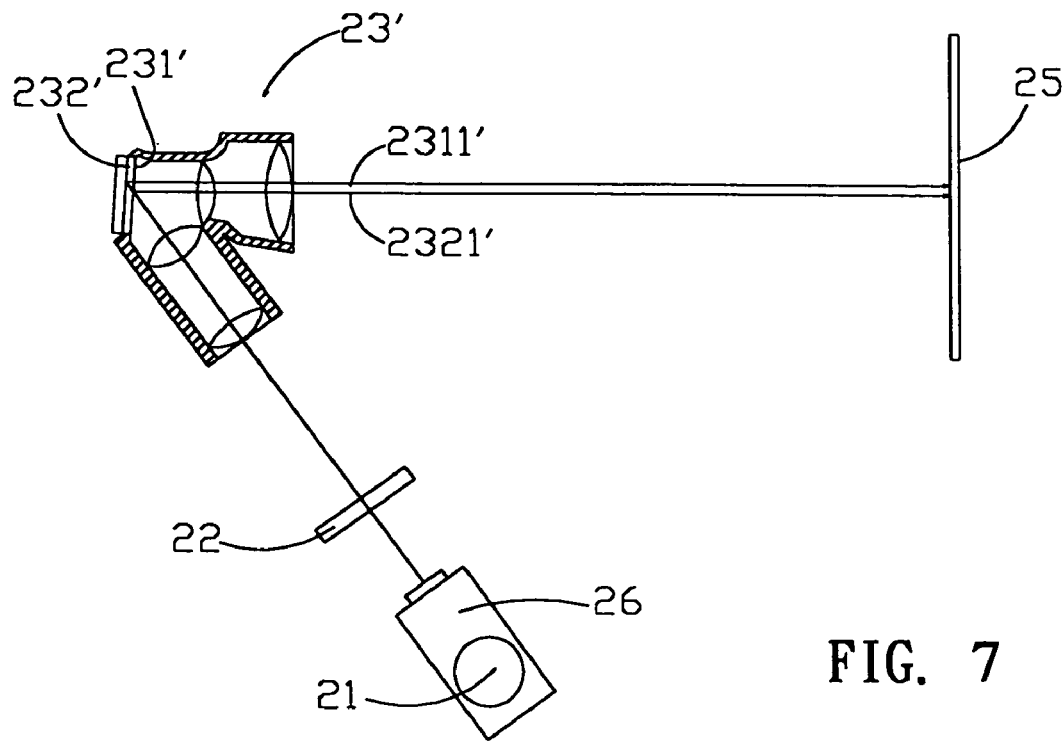
FIG. 7 is a schematic view showing a projection system according to a second embodiment of the invention.

As shown in FIG. 7, the projection system 2 according to the second embodiment of the invention includes a light source 21, an image unit 22, a projection unit 23', a screen 25, and a driving unit 26. Since the structure, positions, and functions of the light source 21, the image unit 22, the screen 25, and the driving unit 26 are the same as the projection system 2 of the first embodiment, the description thereof would not be repeated here. In the present embodiment, the projection unit 23' is installed on the route of the image light to receive the image light produced by the image unit and has at least one light-pervious reflecting layer 231' and a reflecting layer 232'. The light-pervious reflecting layer 231' reflects part of the received image light to form a first image light 2311'. The reflecting layer 232' reflects totally the received image light to form a second image light 2321'. There is a first displacement between the first image light 2311' and the second image light 2321'.

The projection unit 23' projects the first image light 2311' and the second image light 2321' so as to form a first image 251 and a second image 252 on the screen 25, respectively. There is a second displacement between the first image 251 and the second image 252, as shown in FIG. 5.

The first displacement between the first image light 2311' and the second image light 2321' results in the second displacement between the first image 251 and the second image 252. With reference to FIG. 5, there are still images at the grid lines caused by the opaque region 2212. Therefore, the grid effect can be reduced or even removed.

Figure 8:
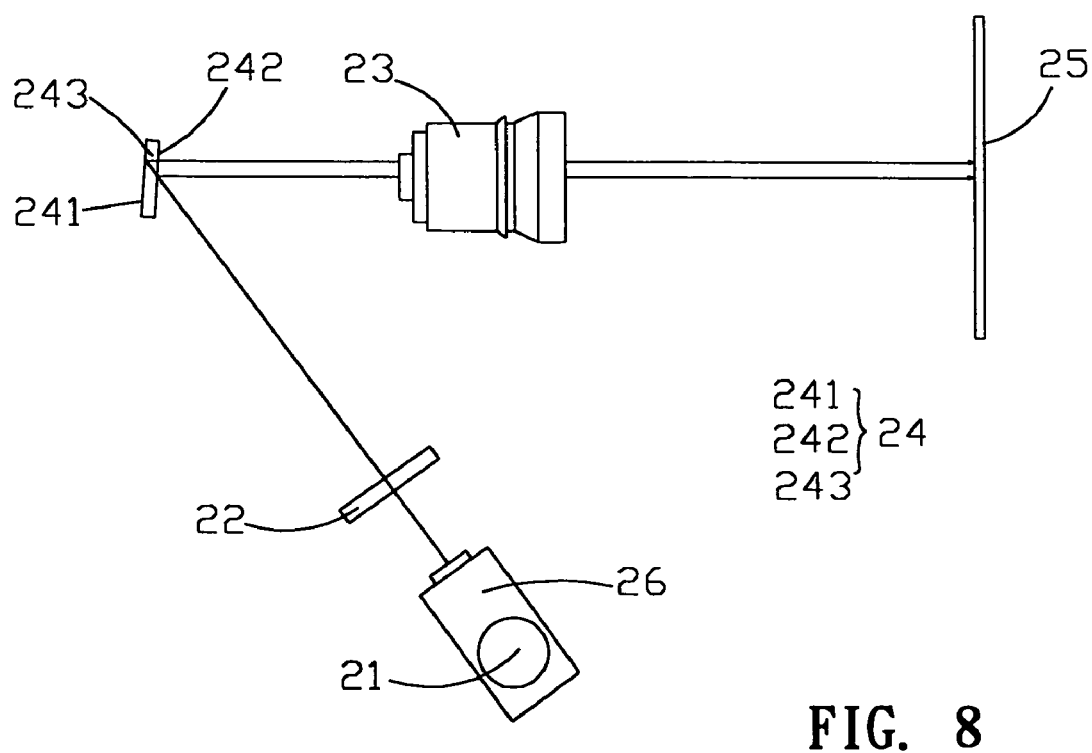
FIG. 8 is a schematic view showing a projection system according to a third embodiment of the invention.

According to the third embodiment shown in FIG. 8, the projection system 2 includes a light source 21, an image unit 22, a projection unit 23, a light-reflecting unit 24, a screen 25, and a driving unit 26. Since the structure and functions of the light source 21, the image unit 22, the projection unit 23, the light-reflecting unit 24, the screen 25, and the driving unit 26 are the same as those in the first embodiment, the description thereof would not be repeated here. In the current embodiment, the light-reflecting unit 24 receives the image light produced by the image unit 22, and then reflects the received image light as a first image light 2421 and a second image light 2411. The projection unit 23 receives the first image light 2421 and the second image light 2411 and projects them out.

Please refer to FIG. 5. As described in the first embodiment, the first displacement between the first image light 2421 and the second image light 2411 results in the second displacement between the first image 251 and the second image 252. There are still images at the grid lines caused by the opaque region 2212. Therefore, the grid effect can be reduced or even removed.

Figure 9:
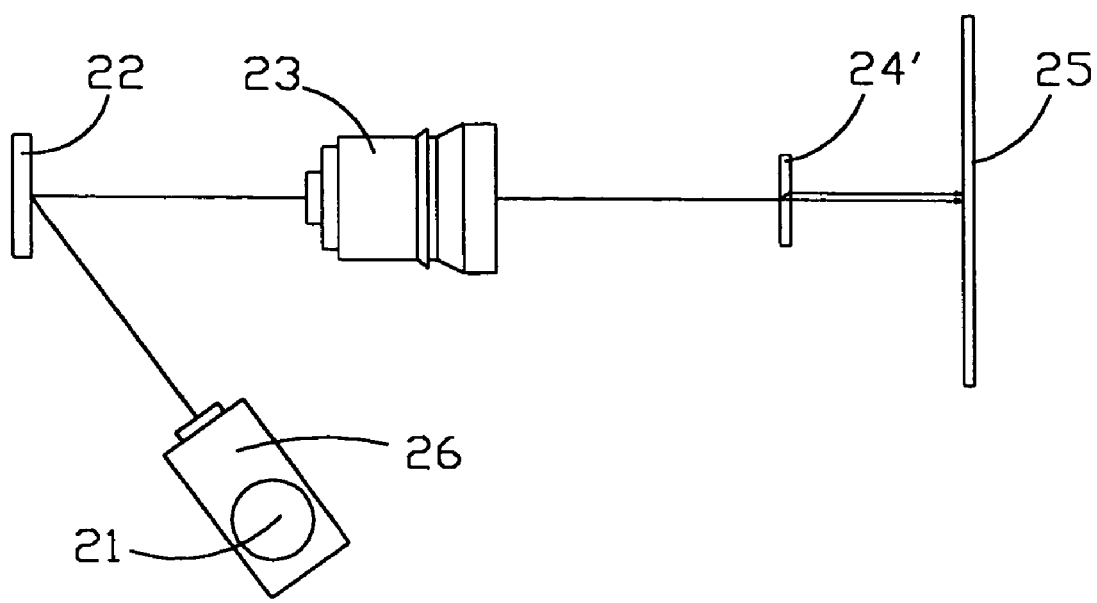
FIG. 9 is a schematic view showing a projection system according to a fourth embodiment of the invention.

With reference to FIG. 9, a projection system 2 according to the fourth embodiment of the invention includes a light source 21, an image unit 22, a projection unit 23, a birefringent unit 24', and a screen 25. Since the structure, positions, and functions of the light source 21, the image unit 22, the screen 25, and the driving unit 26 are the same as those of the first embodiment, the description thereof would not be repeated here. In this embodiment, the birefringent unit 24' is used to replace the light-reflecting unit 24.

The birefringent unit 24' is installed on the route of the image light to receive the image light projected form the projection unit 23 and to refract the received image light out as several refractive image lights. There is a displacement between the refractive image lights. In this embodiment, the birefringent unit 24' is a birefringent crystal.

The screen 25 is provided on the route of the several refractive image lights to form several images on the screen 25 that are separated by a displacement.

With reference to FIG. 5, since there is a displacement between two of the refractive image lights, there is also a displacement between the images formed on the screen 25. There are still images at the grid lines caused by the opaque region 2212. Therefore, the grid effect can be reduced or even removed.

Figure 10:
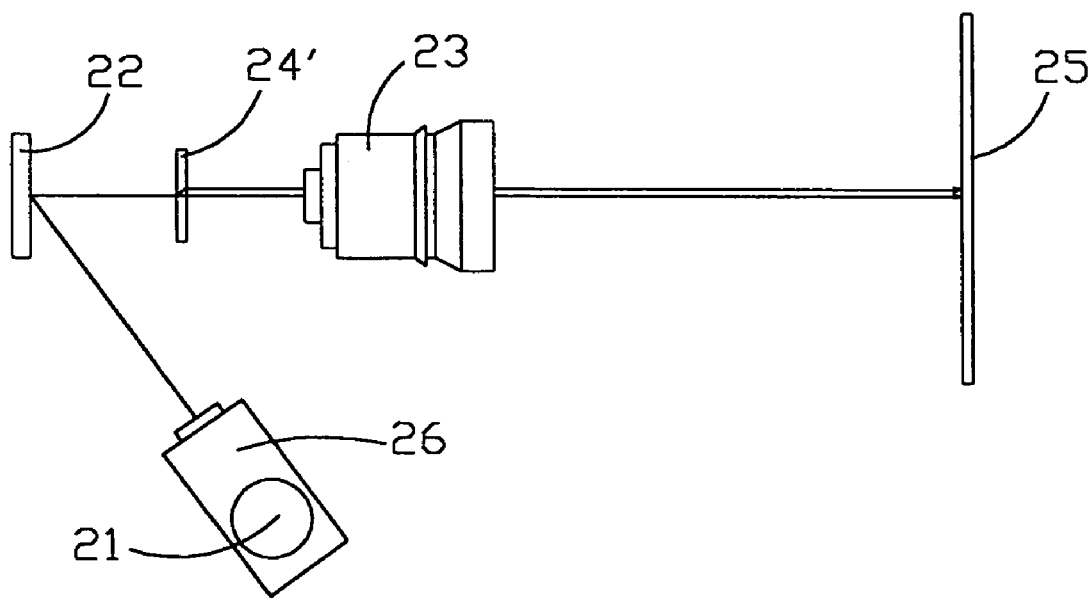
FIG. 10 is a schematic view showing a projection system according to a fifth embodiment of the invention.

As shown in FIG. 10, a projection system 2 according to the fifth embodiment of the invention includes a light source 21, an image unit 22, a projection unit 23, a birefringent unit 24', a screen 25, and a driving unit 26. Since the structure and functions of the light source 21, the image unit 22, the projection unit 23, and the driving unit 26 are the same as those of the first embodiment, and the screen 25 is the same as that of the fourth embodiment, the description thereof would not be repeated here. In this embodiment, the birefringent unit 24' receives the image light produced by the image unit 22 and refracts it into several refractive image lights that have a displacement in between. The projection unit 23 is provided on the route of the refractive image lights and projects the received refractive image lights out.

As shown in FIG. 5, since there is a displacement between two of the refractive image lights, there is also a displacement between the images formed on the screen 25. There are still images at the grid lines caused by the opaque region 2212. Therefore, the grid effect can be reduced or even removed.

Figure 11:
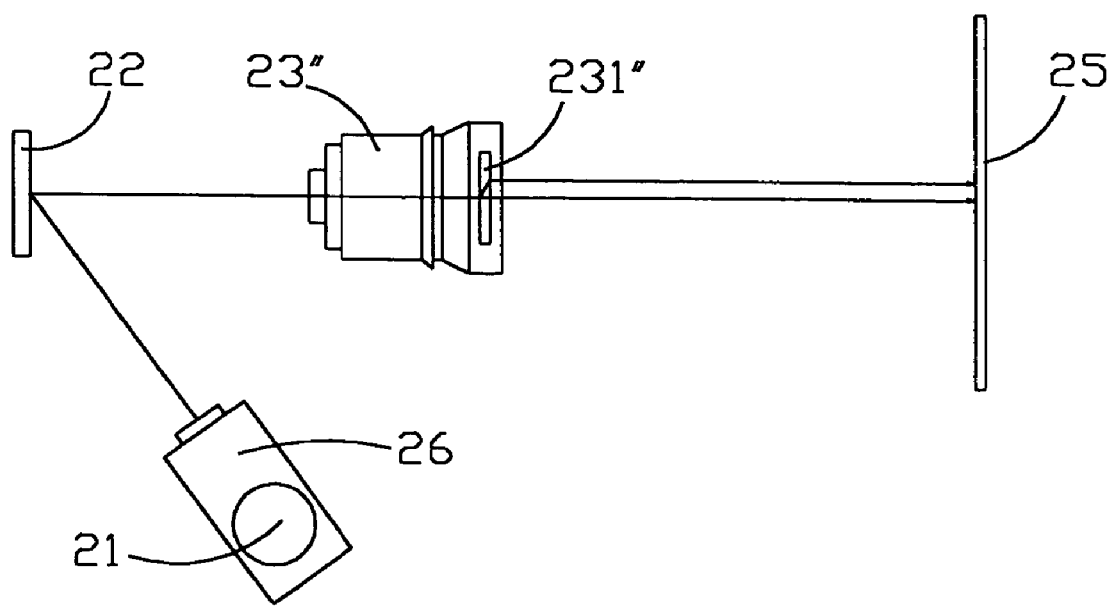
FIG. 11 is a schematic view showing a projection system according to a sixth embodiment of the invention.

As shown in FIG. 11, a projection system 2 according to the sixth embodiment of the invention includes a light source 21, an image unit 22, a projection unit 23", a screen 25, and a driving unit 26. Since the positions, structure, and functions of the light source 21, the image unit 22, and the driving unit 26 are the same as those of the first embodiment, and the screen 25 is the same as that of the fourth embodiment, the description thereof would not be repeated here. In the present embodiment, the projection unit 23" receives the image light produced by the image unit 22 and has a birefringent device 231". The birefringent device 231" receives the image light and refracts it out as several refractive image lights. The projection unit 23" projects the refractive image lights onto the screen 25.

As shown in FIG. 5, since there is a displacement between two of the refractive image lights, there is also a displacement between the images formed on the screen 25. There are still images at the grid lines caused by the opaque region 2212. Therefore, the grid effect can be reduced or even removed.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A projection system, comprising:
a light source, which emits a light beam;
an image unit, which receives the light beam from the light source and produces an image light;
a projection unit, which is provided on the route of the image light to receive the image light produced by the image unit and to project the received image light out;
a light-reflecting unit, which is provided on the route of the image light and has a reflecting layer and a plurality of light-pervious reflecting layers to receive the image light projected by the projection unit, each of the light-pervious reflecting layers reflecting part of the received image light to form a first image light and the reflecting layer reflecting totally the received image light to form a second image light; and a screen, which is installed on the route of the first image light and the second image light to form a first image and a second image on the screen, respectively, wherein there is a displacement between the first image and the second image.

2. A projection system, comprising:

a light source, which emits a light beam;

an image unit, which receives the light beam from the light source and produces an image light;

a projection unit, which is provided on the route of the image light to receive the image light produced by the image unit, wherein the projection unit has a reflecting layer and a plurality of light-pervious reflecting layers, each of the light-pervious reflecting layers reflect part of the received image light to form a first image light, the reflecting layer reflects totally the received image light to form a second image light, and the projection unit projects the first image light and the second image light out; and a screen, which is installed on the route of the first image light and the second image light to form a first image and a second image on the screen, respectively, wherein there is a displacement between the first image and the second image.

3. A projection system, comprising:

a light source, which emits a light beam;

an image unit, which receives the light beam from the light source and produces an image light;

a light-reflecting unit, which is provided on the route of the image light and has a reflecting layer and a plurality of light-pervious reflecting layers to receive the image light projected by the image unit, each of the light-pervious reflecting layers reflecting part of the received image light to form a first image light and the reflecting layer reflecting totally the received image light to form a second image light;

a projection unit, which is provided on the route of the first image light and the second image light to receive the first image light and the second image light, and to project the received first image light and the received second image light out; and a screen, which is installed on the route of the first image light and the second image light to form a first image and a second image on the screen, respectively, wherein there is a displacement between the first image and the second image.

* * * * *